(12) United States Patent
Jang et al.

(10) Patent No.: US 9,484,752 B2
(45) Date of Patent: Nov. 1, 2016

(54) MULTI-CHARGING DEVICE FOR CONNECTING AND CHARGING PORTABLE TERMINAL

(71) Applicant: Samsung Electronics Co. Ltd., Suwon-si, Gyeonggi-do (KR)

(72) Inventors: Yong-Sung Jang, Seongnam-si (KR); Deok-Seong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 634 days.

(21) Appl. No.: 13/903,401

(22) Filed: May 28, 2013

(65) Prior Publication Data

US 2013/0320916 A1    Dec. 5, 2013

(30) Foreign Application Priority Data

Jun. 5, 2012  (KR) .................. 10-2012-0060353

(51) Int. Cl.
*H02J 7/00*         (2006.01)
(52) U.S. Cl.
CPC ............ *H02J 7/0013* (2013.01); *H02J 7/0027* (2013.01); *H02J 7/0044* (2013.01)
(58) Field of Classification Search
CPC ..... H02J 7/0013; H02J 7/0027; H02J 7/0044
USPC ....................................................... 320/107
See application file for complete search history.

(56) References Cited

U.S. PATENT DOCUMENTS

| 2007/0188137 A1* | 8/2007 | Scheucher ............... H02J 1/10 320/116 |
| 2009/0096336 A1* | 4/2009 | Petrick ............... G06F 13/4022 312/237 |
| 2013/0175993 A1* | 7/2013 | Chen .................... H02J 7/0027 320/114 |
| 2015/0061571 A1* | 3/2015 | Lin ...................... H02J 7/0044 320/107 |

FOREIGN PATENT DOCUMENTS

| CN | 1 812 224 A | 8/2006 |
| EP | 2 426 608 A2 | 3/2012 |
| TW | M424624 U | 3/2012 |

* cited by examiner

*Primary Examiner* — Yalkew Fantu
*Assistant Examiner* — Manuel Hernandez
(74) *Attorney, Agent, or Firm* — Jefferson IP Law, LLP

(57) ABSTRACT

A multi-charging device for a portable terminal is provided. The device includes a cabinet, a plurality of charging bodies accommodated in the cabinet, a plurality of slots formed in each of the plurality of charging bodies, a plurality of charging terminals each provided in a corresponding one of the slots, and a power supply unit supplying power to each of the charging terminals. When the portable terminal is inserted into one of the slots, a charging terminal provided in the slot is connected to the inserted portable terminal.

18 Claims, 4 Drawing Sheets

MULTI-CHARGING DEVICE FOR CONNECTING AND CHARGING PORTABLE TERMINAL

PRIORITY

This application claims the benefit under 35 U.S.C. §119(a) of a Korean patent application filed on Jun. 5, 2012 in the Korean Intellectual Property Office and assigned Serial No. 10-2012-0060353, the entire disclosure of which is hereby incorporated by reference.

BACKGROUND OF THE INVENTION

1. Field of the Invention

The present invention relates to a charging device for a portable terminal. More particularly, the present invention relates to a multi-charging device capable of charging a plurality of portable terminals simultaneously.

2. Description of the Related Art

A portable terminal is typically a device with which a user can communicate with another user through a base station, or connect to a service provided by a service provider, while carrying the device with him or her. The development of mobile communication technology and the information communication industry has rapidly expanded service coverage for portable terminals. For example, although the mobile communication service was confined to services such as paging, voice call, Short Messaging Service (SMS), etc. in its early development stage, it has since been extended to provide other services such as multimedia services including video, entertainment services including gaming, and financial services including mobile banking. In addition, a wide range of users from children and teenagers to elderly persons regularly use portable terminals.

Recently, enhanced multimedia service has been made available through portable terminals. Now the performance of portable terminals rivals that of a typical Personal Computer (PC), as observed in smart phones or tablet PCs. Therefore, an environment has been built in which a user can browse the Internet, view a video, and further conduct business using a smart phone or a tablet PC, while moving. In addition, efforts are also underway to substitute the use of tablet PCs for paper text books or print-outs at classes, lectures, and seminars.

Regarding portable terminals such as tablet PCs that are used by multiple participants in a school, a lecture room, or a seminar, they are typically managed and distributed to users on a temporary basis by a school or other host. Accordingly, it is preferable to keep the battery packs of the portable terminals charged to or above an acceptable level in order to use the portable terminals normally for at least a predetermined time. A portable terminal may be unusable for its intended purpose if its battery is not charged to the acceptable level to last the duration of the intended use.

However, available devices for readily charging tens to hundreds of portable terminals have undesirable characteristics. Since portable terminals are typically fabricated and sold for individual use on the whole, one charger kit is usually supplied with each portable terminal Since a charger is usually connected to an interface connector of a portable terminal by cable, a user manually connects the portable terminal to the charger. Accordingly, much time and energy are used to connect the battery packs of portable terminals that are temporarily provided to a plurality of users, such as in a lecture or seminar, to chargers, to thereby keep the battery packs charged to an acceptable power level.

Therefore, a need exists for an apparatus of a multi-charging device for providing easy connectivity and simultaneously charging a plurality of portable terminals.

SUMMARY OF THE INVENTION

Aspects of the present invention are to address at least the above-mentioned problems and/or disadvantages and to provide at least the advantages described below. Accordingly, an aspect of the present invention is to provide a multi-charging device for providing easy connectivity and simultaneously charging a plurality of portable terminals.

Another aspect of the present invention is to provide a multi-charging device for simultaneously charging a plurality of portable terminals and readily indicating the charged states of the individual portable terminals.

A further aspect of the present invention is to provide a multi-charging device which is configured to function by charging a portable terminal through insertion and thus minimize the outward exposure of a cable.

In accordance with an aspect of the present invention, a multi-charging device for a portable terminal is provided. The device includes a cabinet, a plurality of charging bodies accommodated in the cabinet, and a plurality of slots formed in each of the plurality of charging bodies, each of a plurality of charging terminals being provided in a corresponding one of the slots. A power supply unit supplies power to each of the charging terminals. When the portable terminal is inserted into one of the slots, a charging terminal provided in the slot is connected to the inserted portable terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference will be made to exemplary embodiments of the present invention with reference to the attached drawings. A detailed description of a generally known function and structure of exemplary embodiments of the present invention will be avoided.

Figure 1:
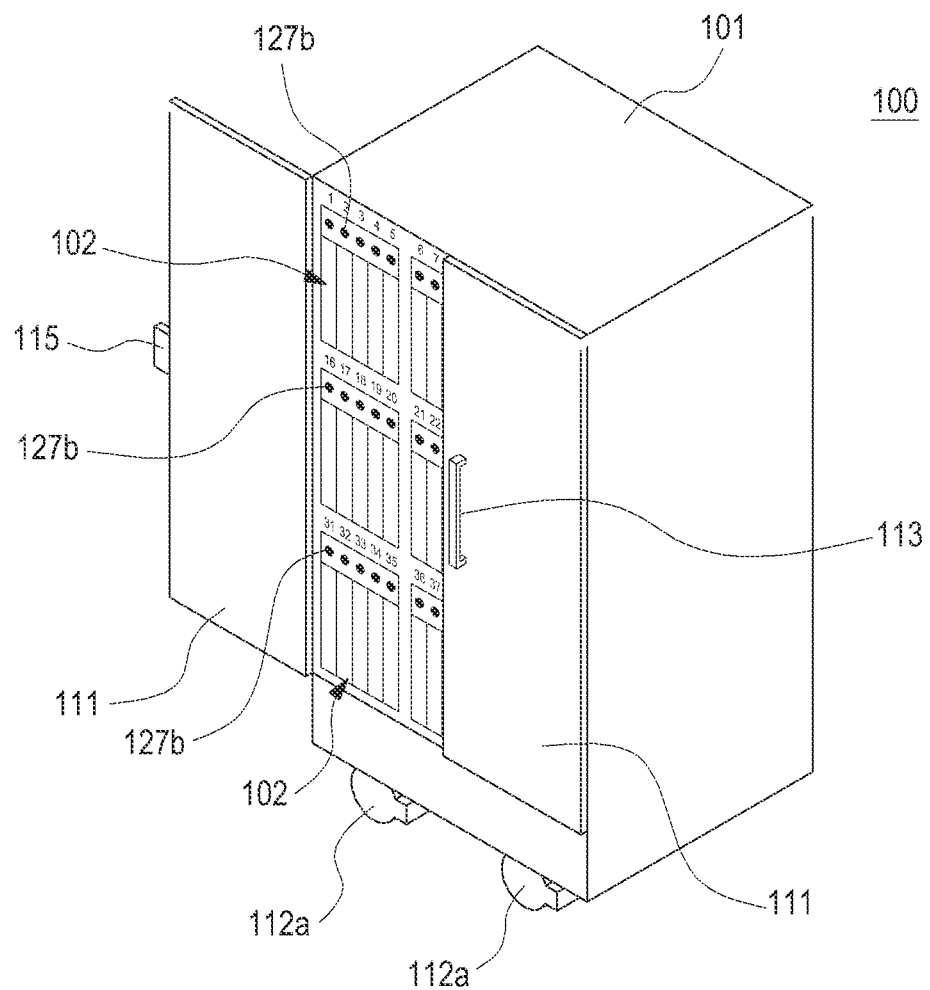
FIG. 1 is a perspective view of a multi-charging device for a portable terminal according to an exemplary embodiment of the present invention.
Figure 2:
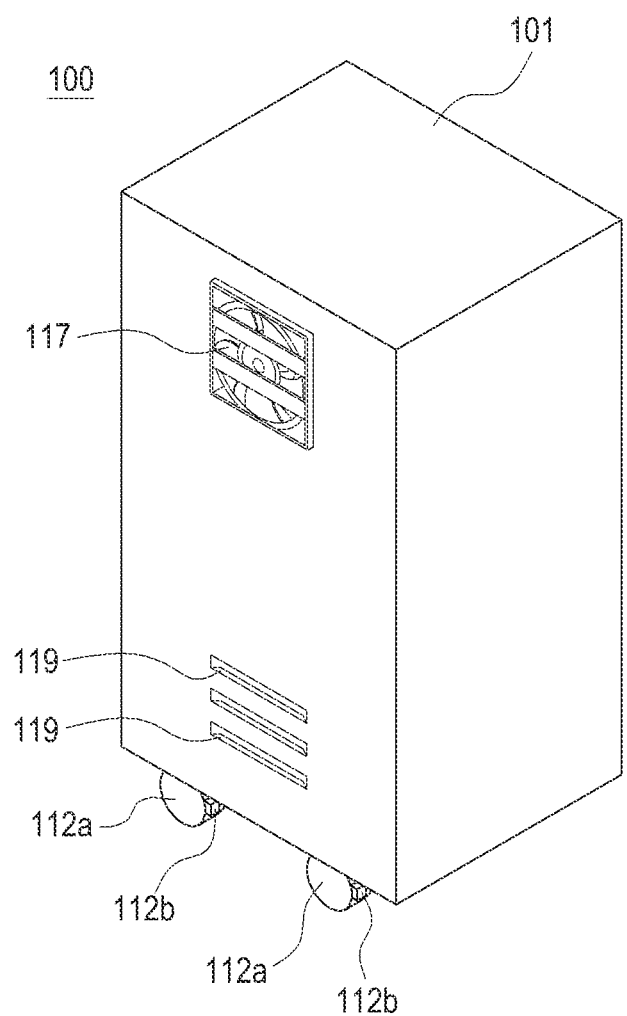
FIG. 2 is a rear perspective view of a multi-charging device such as the multi-charging device illustrated in FIG. 1, according to an exemplary embodiment of the present invention.

FIG. 1 is a perspective view of a multi-charging device for a portable terminal according to an exemplary embodiment of the present invention. FIG. 2 is a rear perspective view of a multi-charging device such as the multi-charging device illustrated in FIG. 1, according to an exemplary embodiment of the present invention.

Referring to FIGS. 1 and 2, a multi-charging device 100 for a portable terminal 10 according to an exemplary embodiment of the present invention accommodates a plurality of charging bodies 102 in a cabinet 101, and a plurality of slots 123*b* are formed in each charging body 102. A charging terminal 125*b* connected to a power supply unit 137 is installed in each slot 123*b*. The portable terminal 10 is inserted into a slot 123*b* and thus connected to a charging terminal 125*b* installed in the slot 123*b*.

At least one charging body 102, e.g., 9 charging bodies 102, are contained in the cabinet 101, charging terminals 125*b* are placed in the slots 123*b* of each charging body 102, and the power supply unit 137 is connected to the respective charging terminal 125*b* by a cable bundle 139, for supplying charging power to the charging terminals 125*b*. The configuration of the charging body 102 will be described in greater detail below with reference to FIG. 3.

The cabinet 101 may be provided with a cooling fan 117 and an air inlet 119. The cooling fan 117 is installed in a through hole formed into the rear surface of the cabinet 101 and discharges air from inside the cabinet 101 to the outside. However, the present invention is not limited thereto. For example, a cooling fan 117 may blow cooling air from outside the cabinet 101 to the inside. Generally, the cooling fan 117 and air inlet 119, if present, may be arranged such that the cooling air enters relatively low on the cabinet 101 and the exhaust is relatively high on the cabinet 101. While the portable terminal 10 is being charged, heat may be emitted from the power supply unit 137 or the portable terminal 10. If the multi-charging device 100 charges a plurality of portable terminals 10 simultaneously, the operation efficiency of the power supply unit 137 may be decreased due to heat generated inside the cabinet 101. Therefore, it is preferable to remove heat from inside the cabinet 101 by running the cooling fan 117, when the multi-charging device 100 is in operation. The heat discharge from the cabinet 101 may be accelerated by introducing external air into the cabinet 101 through the air inlet 119. Preferably, an anti-dust screen is mounted to the air inlet 119, thereby preventing introduction of dust.

The cooling fan 117 may be fully exposed by fully opening the hole in which the cooling fan 117 is disposed. Alternatively or additionally, a moving diaphragm may be provided so as to cover the hole of the cooling fan 117 when the cooling fan 117 is not running. The moving diaphragm may be configured to automatically control the degree to which the hole is opened according to the running speed of the cooling fan 117 or the inner temperature of the multi-charging device 100. While the anti-dust screen is installed on the air inlet 119 to prevent dust introduction, by way of example, dust introduction may further or alternatively be minimized using the shape of the air inlet 119. The hole of the cooling fan 117 may also be shaped into a set of slits, like the air inlet 119. However, the present invention is not limited thereto; for example, any arrangement of hole elements may be used that allows sufficient airflow through the hole of cooling fan 117 and the air inlet 119.

To prevent introduction of dust by covering the charging bodies 102 and to prevent theft of the portable terminal 10 while it is being charged, the multi-charging device 100 may further be provided with a cover 111 and a locking device 115. The cover 111 may be movably installed to the cabinet 101, for opening and closing access to the charging bodies 102. In accordance with an exemplary embodiment of the present invention, a pair of covers 111 is installed on opposite sides of the cabinet 101, for opening and closing access to the charging bodies 102. A handle 113 and the locking device 115 are installed on the covers 111. While the portable terminal 10 is being charged, the covers 111 close access to the charging bodies 102 and the locking device 115 locks the covers 111, thus acting to prevent theft of the portable terminal 10.

To facilitate movement or delivery of the multi-charging device 100, the multi-charging device 100 may include wheels 112*a*. A plurality of wheels 112*a*, preferably three or more wheels 112 are installed on the bottom surface of the cabinet 101. To prevent unintended rolling of the wheels 112*a* after the cabinet 101 is placed at an appropriate location, the wheels 112*a* may include locking levers 112*b*, as further illustrated in FIGS. 5 and 6.

Figure 5:
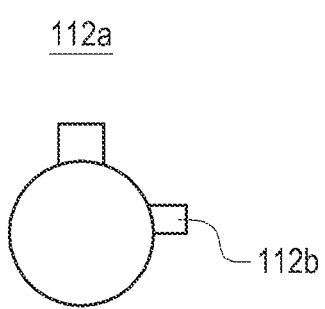
FIG. 5 illustrates a wheel in a multi-charging device such as the multi-charging device illustrated in FIG. 1, according to an exemplary embodiment of the present invention.
Figure 6:
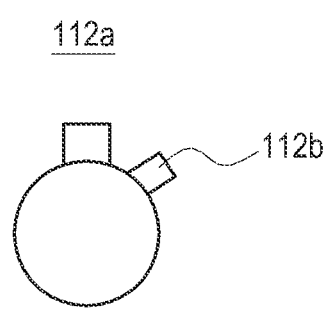
FIG. 6 illustrates a wheel such as the wheel illustrated in FIG. 5, in an unlocked state according to an exemplary embodiment of the present invention.

FIG. 5 illustrates a wheel in a multi-charging device such as the multi-charging device illustrated in FIG. 1, according to an exemplary embodiment of the present invention. FIG. 6 illustrates a wheel such as the wheel illustrated in FIG. 5, in an unlocked state according to an exemplary embodiment of the present invention.

As shown in FIGS. 5 and 6, the wheels 112*a* are locked or unlocked according to the position of the locking levers 112*b*. In particular, FIG. 5 illustrates an exemplary locked state of a wheel 112*a* and FIG. 6 illustrates an exemplary unlocked state of the wheel 112*a*. The locking levers 112*b* may, for example, lock the wheels 112*a* such that they cannot roll, such that their orientation or direction cannot change, or both. Therefore, an operator can move the multi-charging device 100 to an intended location when needed and then utilize locking levers 112b to keep the multi-charging device 100 stationary.

Now the structure of a charging body 102 will be described below in greater detail with reference to FIGS. 3 and 4.

Figure 3:
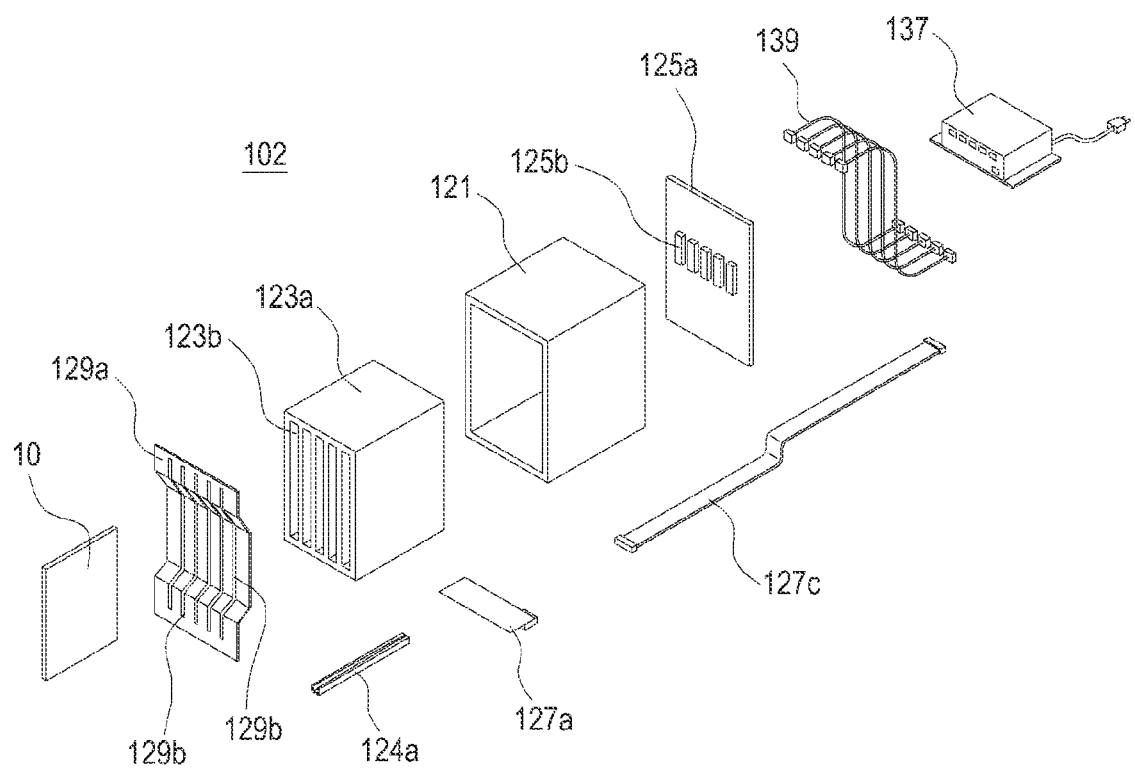
FIG. 3 is an exploded perspective view of a charging body and a power supply unit in a multi-charging device such as the multi-charging device illustrated in FIG. 1, according to an exemplary embodiment of the present invention.

FIG. 3 is an exploded perspective view of a charging body and a power supply unit in a multi-charging device such as the multi-charging device illustrated in FIG. 1, according to an exemplary embodiment of the present invention. FIG. 4 is a perspective view of a guide member in a multi-charging device such as the multi-charging device illustrated in FIG. 3, according to an exemplary embodiment of the present invention.

Figure 4:
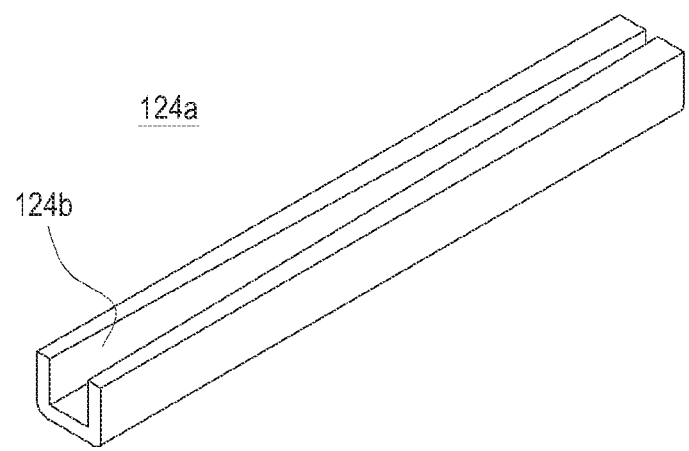
FIG. 4 is a perspective view of a guide member in a multi-charging device such as the multi-charging device illustrated in FIG. 3, according to an exemplary embodiment of the present invention.

Referring to FIGS. 3 and 4, the charging body 102 includes a plurality of slots 123b inside it so that the portable terminal 10 may be accommodated in a slot 123b and connected to a charging terminal 125b, for charging. The portable terminal 10 may be electrically connected to the charging terminal 125b by physical contacts. Alternatively, the charging body 102 may be provided such that the portable terminal 10 may be electromagnetically coupled to the charging terminal 125b for charging. When the portable terminal 10 is inserted into the slot 123b, the portable terminal 10 is connected to the charging terminal 125b inside the slot 123b. In accordance with an exemplary embodiment of the present invention, a tray 123a is accommodated in the charging body 121 and the slots 123b are formed in the tray 123a in order to accommodate one or more individual portable terminals 10.

Front and rear panels 129a and 125a are engaged with the front and rear surfaces of the charging body 121. Openings 129b corresponding to the slots 123b are formed on the front panel 129a. The portable terminal 10 is inserted into a slot 123b through an opening 129b, to be charged in the multi-charging device 100. To facilitate a user to remove the portable terminal 10 from the multi-charging device 100, the front panel 129a partially exposes the portable terminal 10 inserted into the opening 129b and the slot 123b. That is, the front panel 129a is partially bent in such a manner that a part of the portable terminal 10 inserted in the slot 123b is exposed outward from the charging body 102.

The plurality of charging terminals 125b are installed on the rear panel 125a engaged with the rear surface of the charging body 121.

Each charging body 125b is disposed in correspondence with one of the slots 123b and thus connected to the portable terminal 10 inserted into the slot 123b. The charging terminals 125b are connected to the power supply unit 137 via a part of the cable bundle 139. As described before, the power supply unit 137 supplies charging power to each of the respective charging terminals 125b. That is, the portable terminal 10 inserted into the multi-charging device 100 is charged with charging power received from the power supply unit 137, without intervention of an individual charger or cable. The portable terminal 10 connects to a charging terminal 125b to receive charging power from the power supply unit 137 by inserting the portable terminal 10 into the opening 129b and the slot 123b. The portable terminal 10, opening 129b, and slot 123b may be configured such that the portable terminal can only be inserted when in at least one predetermined orientation; alternatively, the portable terminal 10, opening 129b, slot 123b, and charging terminal 125b may be configured such that the portable terminal may be inserted and receive charging power in any orientation.

A guide member 124a is installed in the charging body 102 to guide an interface port, i.e. a charging end of the portable terminal 10 inserted into a slot 123b to be connected to a charging terminal 125b. The guide member 124a has a guide groove 124b for surrounding side surfaces of the portable terminal 10 inserted into the slot 123b. To facilitate insertion of the portable terminal 10 and guide the charging end of the portable terminal 10 to the charging terminal 125b, the guide groove 124b is preferably narrower as it is closer to the charging terminal 124b. That is, the width of the guide groove 124b is gradually decreased from the entrance of the guide groove 124b to the end of the guide groove 124b nearer to the charging terminal 125b. Therefore, once the user inserts the portable terminal 10 into the slot 123b, the charging end of the portable terminal 10 can be connected to the charging terminal 125b, without the need for the user to align the charging end of the portable terminal 10 to the charging terminal 125b. A pair of guide members 124a may be arranged, facing each other in the slot 123b so as to guide the portable terminal 10 along an insertion direction, surrounding opposite side surfaces of the portable terminal 10 inserted into the slot 123b. The shape and size of a guide member 124a may be configured according to the size and shape of the portable terminal 10 or the position of the interface connector, i.e., a charging end of the portable terminal 10. In this manner, the charging end of the portable terminal 10 inserted into the slot 123b can be aligned accurately to the charging terminal 125b.

Each charging body 102 having the above-described configuration may exemplarily include five slots 123b, and nine charging bodies 102 may exemplarily be accommodated in the cabinet 101. However, the present invention is not limited thereto. Therefore, the multi-charging device 100 according to the exemplary embodiment of the present invention is configured so as to charge up to 45 portable terminals 10 at the same time. However, the number of slots 123b or the number of charging bodies 102 in the cabinet 101 may be changed according to requirements of an operator for the multi-charging device 100.

The multi-charging device 100 may include light emitting elements 127b for indicating the charged or charging states of the battery packs of portable terminals 10. The light emitting elements 127b may be installed on the charging bodies 102 or the cabinet 101, preferably at positions corresponding to the respective slots 123b such that a user can readily determine the charged or charging state of each portable terminal 10 by light emitted from the corresponding light emitting element 127b. When the battery pack of a portable terminal 10 inserted into a slot 123b is fully charged, one of the light emitting elements 127b corresponding to the slot 123b may be illuminated a predetermined color, for example, green. If the battery pack is still being charged, the light emitting element 127b may be illuminated a different predetermined color, for example, red. The light emitting element 127b may emit other predetermined colors, and the emitted light may be of different intensities (e.g., dim or bright) or continuities (e.g., steady or blinking at different speeds), according to the charged or charging state of the battery pack. A predetermined light output may also indicate that a battery pack is not accepting a charge, and is therefore defective. Therefore, the operator of the multi-charging device 100 can readily identify the charged or charging state of the battery pack of the portable terminal 10. The light emitting element 127b may emit light when a portable terminal 10 is fully inserted in the corresponding slot and not emit light when the portable terminal 10 is not fully inserted in the slot. By this means a user may readily determine in the dark both whether a portable terminal has been fully inserted in a slot, and which slots have portable terminals available therein. While the light emitting elements 127b may be installed individually on the charging bodies 102 or the cabinet 101, as many light emitting elements as the slots 123b formed in one charging body 102 may be arranged into one module 127a and may be connected to the power supply unit 137 via a ribbon cable 127c in accordance with an exemplary embodiment of the present invention. The light emitting elements 127b are exemplarily depicted in FIG. 1 located above the corresponding slots 123b; however, the present invention is not limited thereto. For example, the light emitting elements 127b may be located below the slots 123b. Alternatively, the slots 123b may be oriented horizontally, and the light emitting elements 127b may be located to the left or right of the corresponding slots 123b.

A serial number may be assigned to each slot 123b, so that the operator may more easily manage the multi-charging device 100. For example, while a plurality of portable terminals are being charged at the same time, the operator can easily identify the portable terminals that are still being charged. In addition, the operator can readily determine whether the charging function of each slot is performed normally, that is, whether a specific slot is defective in the charging function and can manage the slot accordingly.

As is apparent from the above description of exemplary embodiments of the present invention, since portable terminals can be connected to charging terminals simply by inserting them into the multi-charging device having the above-described configuration, the multi-charging device is very useful when a plurality of portable terminals are to be charged simultaneously. Therefore, with the multi-charging device, a plurality of portable terminals can be easily charged, which are to be temporarily distributed to participants in class, lecture, seminar, etc. In addition, an individual charging cable connected to a portable terminal is not exposed outward, thereby improving an appearance of the multi-charging device as well as removing opportunities for such a charging cable to be damaged or incorrectly connected. Furthermore, as the multi-charging device is provided with a light emitting element at a position corresponding to each slot, the charged or charging state of a portable terminal inserted therein can be easily identified. Since a cooling fan discharges heat from inside a cabinet, the multi-charging device can operate stably. The multi-charging device can be moved easily by use of wheels. Installation of a cover for closing access to a portable terminal while it is being charged and a locking device for locking the cover on the cabinet can prevent theft of the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A multi-charging device for a portable terminal, the device comprising:
   a cabinet;
   a plurality of charging bodies accommodated in the cabinet;
   a plurality of slots formed in each of the plurality of charging bodies;
   a plurality of charging terminals, each charging terminal being provided in a corresponding one of the slots;
   guide members formed of an elastic material and disposed in each of the slots;
   guide grooves formed on each of the guide members and extended from an entrance of the slots toward the charging terminals, wherein the guide grooves are configured to surround side surfaces of the portable terminal inserted into the slot and to guide a charging end of the portable terminal to the charging terminals; and
   a power supply unit for supplying power to each of the charging terminals,
   wherein a width of the guide groove gradually decreases from an entrance end of the guide groove to an end of the guide groove nearer to the charging terminal such that inserting the portable terminal into one of the slots connects the charging terminal provided in the slot to the inserted portable terminal.

2. The device of claim 1, further comprising:
   a tray accommodated in each of the charging bodies,
   wherein the slots of the charging body are formed in the tray.

3. The device of claim 2, further comprising:
   a front panel mounted to a front surface of each of the charging bodies; and
   a plurality of openings formed on the front panel, at positions corresponding to the slots of the charging body.

4. The device of claim 3, wherein the front panel is configured such that the inserted portable terminal protrudes at least partially therefrom.

5. The device of claim 2, further comprising:
   a rear panel mounted to a rear surface of each of the charging bodies,
   wherein charging terminals are provided to the rear panel of the charging body, at positions corresponding to the slots of the charging body.

6. The device of claim 1, further comprising:
   a plurality of light emitting elements installed in the charging bodies, for displaying a charged or charging state of a battery pack of a portable terminal inserted therein,
   wherein each of the light emitting elements is arranged adjacent to a corresponding one of the slots.

7. The device of claim 6, wherein each of the light emitting elements comprises an indicator function comprising at least one of a plurality of predetermined colors, a plurality of predetermined intensities, and a plurality of predetermined steady or blinking states.

8. The device of claim 7, wherein the indicator function indicates at least one of a charge level of the battery pack, a charging rate of the battery pack, and a functional or defective condition of the battery pack.

9. The device of claim 1, further comprising a cable bundle for connecting the power supply unit to each of the charging terminals.

10. The device of claim 1, wherein each of the charging bodies includes five slots and the cabinet accommodates nine charging bodies.

11. The device of claim 1, further comprising a cooling fan installed on a rear surface of the cabinet, for discharging air from inside the cabinet to the outside of the cabinet.

12. The device of claim 11, further comprising at least one air inlet comprising a dust filter formed in at least one of a front surface, a rear surface, and side surfaces of the cabinet.

13. The device of claim 1, further comprising a plurality of wheels installed on a bottom surface of the cabinet.

14. The device of claim 13, wherein each of the wheels includes a locking function controlled by a locking lever.

15. The device of claim 1, further comprising:
a cover, installed on the cabinet, for opening and closing access to the charging bodies; and
a locking device for locking the cover in a closed position.

16. The device of claim 1, wherein the slots each comprise a size and shape according to a size and shape of the portable terminal, such that the portable terminal may be inserted into the slot only in at least one predetermined orientation.

17. The device of claim 1, wherein the charging terminal connects to the portable terminal by electrical contacts.

18. The device of claim 1, wherein the charging terminal connects to the portable terminal by electromagnetic coupling.

* * * * *